Patented Nov. 11, 1924.

1,514,964

UNITED STATES PATENT OFFICE.

FRANK E. HARTMAN, OF SCOTTDALE, PENNSYLVANIA, ASSIGNOR TO ELECTRIC WATER STERILIZER AND OZONE COMPANY, OF SCOTTDALE, PENNSYLVANIA, A CORPORATION OF PENNSYLVANIA.

METHOD OF GENERATING OZONE.

No Drawing.   Application filed January 30, 1923.   Serial No. 615,955.

*To all whom it may concern:*

Be it known that I, FRANK E. HARTMAN, citizen of the United States, residing at Scottdale, in the county of Westmoreland and State of Pennsylvania, have invented certain new and useful Improvements in Methods of Generating Ozone, of which the following is a specification.

This invention relates to an improvement in the art of generating ozone, having for its primary object a novel means for insuring the production of ozone economically and on a feasible commercial basis, as distinguished from the unsatisfactory and uncommercial methods heretofore employed.

Ozone is a valuable oxidizing agent in the chemical industries, but its use on an extended or commercial scale has been greatly restricted due to the more or less prohibitive cost of ozone generating equipment. The ordinary ozone generating equipment utilizing low frequency alternating currents, possesses very small capacity with a relatively large construction cost. Furthermore, the use of these low frequency alternating currents is responsible for the high cost of the present ozone generating equipment.

By experiments and successful demonstration I have found that undamped high frequency alternating electrical currents of approximately 10,000 cycles entirely overcome the objections to the use of the low frequency alternating electrical current. In sharp contrast to the low efficiency and costliness of the low frequency current method of generating ozone, the employment of undamped high frequency alternating electrical currents greatly increases the capacity of existing ozone generators, at the same time establishing a stability of operation which is not appreciably affected by varying temperatures, altitudes, and barometric conditions, thereby making it feasible commercially to manufacture ozone for technical and commercial purposes.

In the use of the high frequency undamped currents it has been demonstrated that the capacity of an ozone generator is almost a straight line function of the cycles of the current with which it is supplied and in stepping from the usual 60 cycles to 500 cycles, and from 500 to 1000 cycles, and so on, a uniform proportionate increase in the capacity of the generator is found to prevail. That is due to the fact that with increased cycles increased energy per unit of electrode surface is obtained, and therefore, a single tube becomes the equivalent of two or more tubes accordingly as the cycles are increased.

I claim:—

An improvement in the art of producing ozone which consists in subjecting the contents of an ozone generating unit to the influence and action of undamped excessively-high high-frequency alternating electrical currents.

In testimony whereof I affix my signature

FRANK E. HARTMAN.